Jan. 8, 1946.   L. D. KLEISS   2,392,798
CATALYTIC CONTACTING METHOD
Filed July 27, 1942   2 Sheets-Sheet 1

INVENTOR
LOUIS D. KLEISS
BY
ATTORNEYS

INVENTOR
LOUIS D. KLEISS

Patented Jan. 8, 1946

2,392,798

UNITED STATES PATENT OFFICE 2,392,798

CATALYTIC CONTACTING METHOD

Louis D. Kleiss, Seattle, Wash., assignor to Phillips Petroleum Company, a corporation of Delaware Application July 27, 1942, Serial No. 452,472

9 Claims. (Cl. 260—683.5)

My invention relates to a new catalytic contacting method which is well adapted to organic reactions, particularly hydrocarbon conversion processes, and apparatus for practicing the same.

Many organic reactions are known to be catalyzed by the so-called Friedel-Crafts type metal halide catalysts. In various hydrocarbon conversion processes, materials such as aluminum chloride, aluminum fluoride and other Friedel-Crafts catalysts have been employed for their catalytic properties in promoting the given reaction. The catalyst is employed in either powder or crystal form. Regardless of which physical state the catalyst originally has, continued use of the material usually results in production of a fluid or semi-fluid mass containing dissolved and/or suspended portions of the catalyst compound and/or complexes thereof with organic reactants, which mass is commonly called "sludge." This sludge eventually will tend to drain down through the catalyst bed, dissolving further quantities of the still unused or solid catalyst, and collects in large quantities at the bottom of the catalyst chamber. Since a large disposition of catalyst in sludge form at the bottom of the chamber is detrimental to the efficient conduct of the conversion process, some considerable loss of time and production is incurred in cleaning out the accumulated sludge to place a given chamber in condition for further use. This sludge usually has considerable catalytic activity, which must be utilized in order to obtain the greatest yield of products per unit of catalyst.

Another use to which such sludge may be put is described and claimed in the copending application of Karl H. Hachmuth and David G. Blaker, Serial No. 460,702, filed October 3, 1942. Said application discloses that aluminum chloride sludges and the like may be contacted with reactants containing small amounts of dissolved or vaporized metal halide to remove the latter from the reactants. For example, in the vapor phase isomerization of normal butane over aluminum chloride, small but appreciable quantities of aluminum chloride vapors are carried from the catalyst zone in the gaseous effluents. Said effluents may be contacted with the partially or completely spent aluminum chloride sludge from the process which will absorb the vaporized aluminum chloride and thus prevent its being carried over into other parts of the system. Totally spent sludge is more effective than catalytically active sludge for this purpose.

I now provide means whereby the sludge may be conveniently returned for further use as a catalyst absorbent, or for other utilization. Specifically, the invention provides an accumulator for the sludge and efficient means for returning the sludge to the top of the chamber or other point for further use.

An object of my invention is to provide for further use of catalyst sludges which are formed in hydrocarbon conversion reactions.

It is an object to provide simple, efficient and inexpensive means for reintroducing the accumulated sludge to the reaction zone.

It is further an object to eliminate the frequent interruptions of a catalytic conversion process which are at present incurred in disposing of sludge accumulations.

Another object is to prolong the useful life of batch-charged solid catalyst beds.

It is a further object to provide a catalytic conversion apparatus which may be continuously operated on a catalyst charge consisting of only partially exhausted catalytic sludge which may be drained from other conventional solid catalyst chambers.

Other advantages and objects will be realized in the practice of my invention, as is set forth in the following specification.

I accomplish the objects of my invention by employing the gas lift or Venturi principle in a novel manner. A portion of the hydrocarbon or other feed stock to the system is diverted from the regular inlet means, and its kinetic energy is utilized to pump the sludge to the desired point in the apparatus and in the desired quantities, thus avoiding the necessity for using reciprocating, centrifugal, or other types of mechanical pumps. The fluid used for this purpose may be either a liquid or a gas, although the latter is more frequently used. In a preferred modification of the invention, a tube with a relatively large opening is provided in the sludge reservoir, and leads to the top of the catalyst chamber. Incoming gases are injected into said opening so that sludge is aspirated and carried along the tube by entrainment or otherwise. If desired, a continuous sludge circulation may be maintained in this way. The sludge so delivered to the proper place in the system then flows over ceramic packing or other suitable contact material adapted to promote intimate contact between reactants and sludge. In this way, the catalytic activity of the sludge is utilized to the optimum extent, and residual catalyst may be removed from reactants under certain conditions. The contact material referred to may be disposed in the same chamber as the catalyst, or in a separate chamber or chambers.

Aluminum chloride and similar metal halide sludges have been found to be very erosive and/or corrosive, particularly when in motion. With this fact in mind, it is obvious that ordinary mechanical means for circulating sludge would have a very short life if made of any of the standard materials of construction. For example, if reactants were merely bubbled through the sludge, the chamber in which this took place would erode very rapidly because of the violent agitation of sludge occurring therein. By flowing sludge over packing material, its motion at the walls of the chamber is reduced to a minimum, with the result that the packed chamber may be made of ordinary steel or the like. The only part of the apparatus subjected to severe erosion and/or corrosion conditions is the tube referred to above, through which entrained sludge is passed. Accordingly, this tube may be constructed from special corrosion-resistant material, while the remainder of the apparatus is made from cheaper materials. Furthermore, the tube may be constructed so that it is readily replaced when necessary. If a mechanical pump were used, the same tube would have to be provided plus corrosion-resistant pump parts.

The accompanying drawings are provided to point out more clearly and to exemplify the invention.

Figure 1:
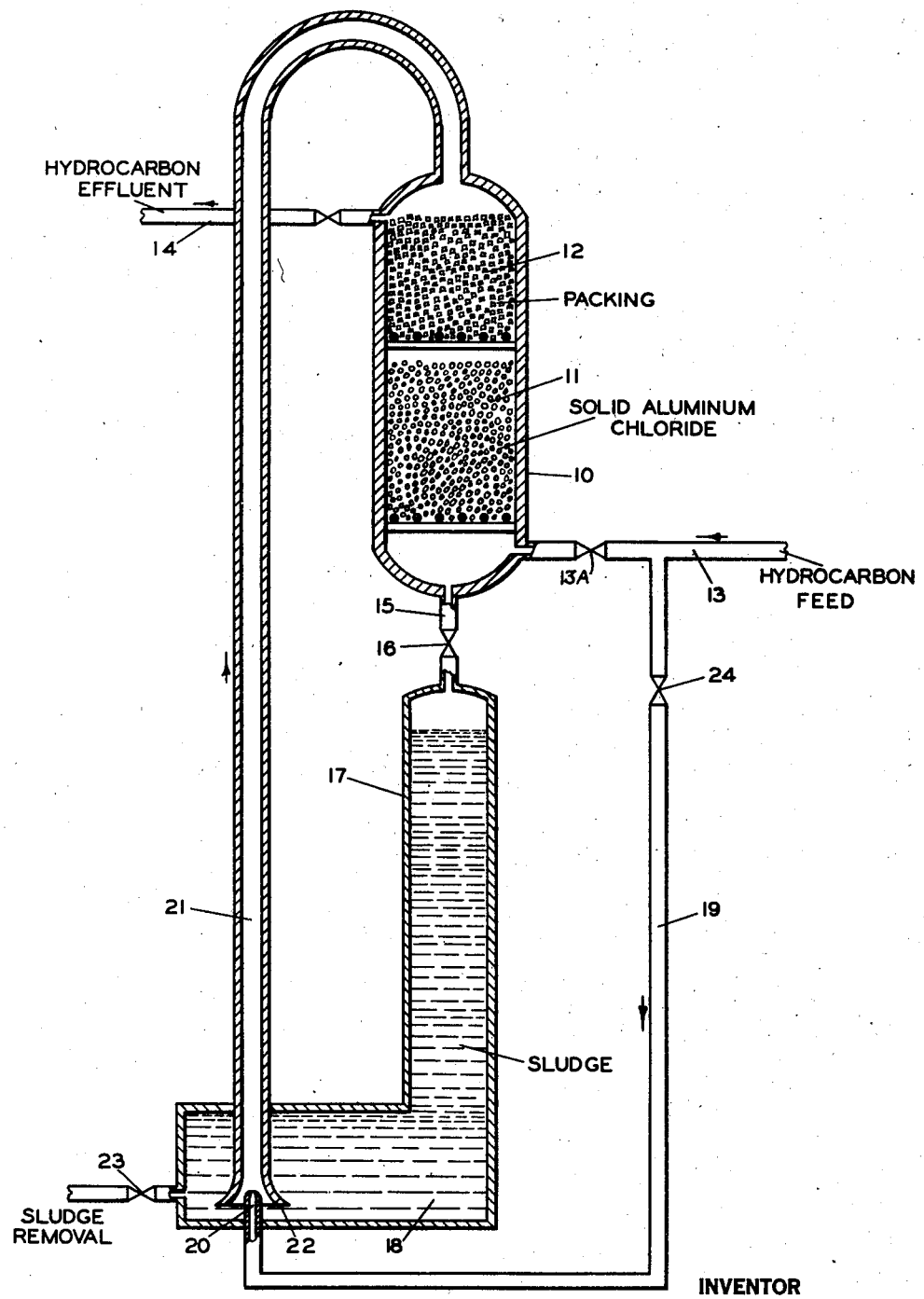
Figure 1 is a schematic illustration of one form of my apparatus wherein the improvements disclosed are adapted to any available catalyst chamber.

Referring specifically to Figure 1, the numeral 10 denotes a catalyst chamber containing a bed of granular or other solid form catalyst 11, and a packing bed 12 of stone rings or the like. A charging line 13 for a gaseous hydrocarbon enters near the bottom of chamber 10, and a withdrawal line 14 leaves the chamber near its top. Connected to the bottom of chamber 10 by a pipe 15, having a valve 16, is a sludge reservoir 17, provided with an expanded portion or well 18. A gas pressure line 19 takes off from the influx line 13, and terminates in a nozzle 20 within the well 18. A vertical riser or lift pipe 12 communicates the well 18 with the top of chamber 10. The lower end of pipe 21, within the well 18, is provided with a flared or bell-like portion 22, which is located above and concentrically disposed with respect to the nozzle 20. A drain valve 23 is provided near or in the bottom of well 18. An adjustable shut-off valve 24 is provided in line 19, and a valve 13A is provided in line 13.

The apparatus as described is particularly suited for carrying out the isomerization of normal butane to isobutane using an aluminum chloride catalyst, although other organic reactions, particularly hydrocarbon conversions such as alkylation or other reforming processes, may of course, be accomplished therein, with due regard for the proper reaction conditions. For a normal butane isomerization process, typical conditions are a temperature of 200° F., a pressure of 150 pounds per square inch gauge, and a flow rate of 1.5 liquid volumes butane per volume catalyst chamber per hour. Anhydrous gaseous hydrogen chloride is preferably used as a catalyst activator, with 3 to 15 mol per cent based on butane feed being a desirable range of concentration. In some cases this hydrogen chloride or other catalyst activator may be used in whole or in part as the fluid which serves to move the sludge to the desired point in the system.

In operation, the hydrocarbon vapor to be treated is fed through line 13 at the desired pressure and temperature. The converted hydrocarbons are withdrawn through line 14 for further processing or other disposal. Upon passing through the solid catalyst bed 11, sludge is formed and drains down through the bed, dissolving and taking with it further catalyst material which is still active.

When a considerable quantity of catalyst-containing sludge has accumulated in reservoir 17 and well 18, part or all of the hydrocarbon feed may be temporarily diverted to line 19 by operation of valve 24. The injecting action of high velocity gas flow through the nozzle 20 will then entrain the sludge in well 18, returning it to the top of chamber 10 via pipe 21. The sludge thus will be deposited on the stone rings or other packing in bed 12, where it may be further contacted with subsequent hydrocarbon feed stock.

Figure 2:
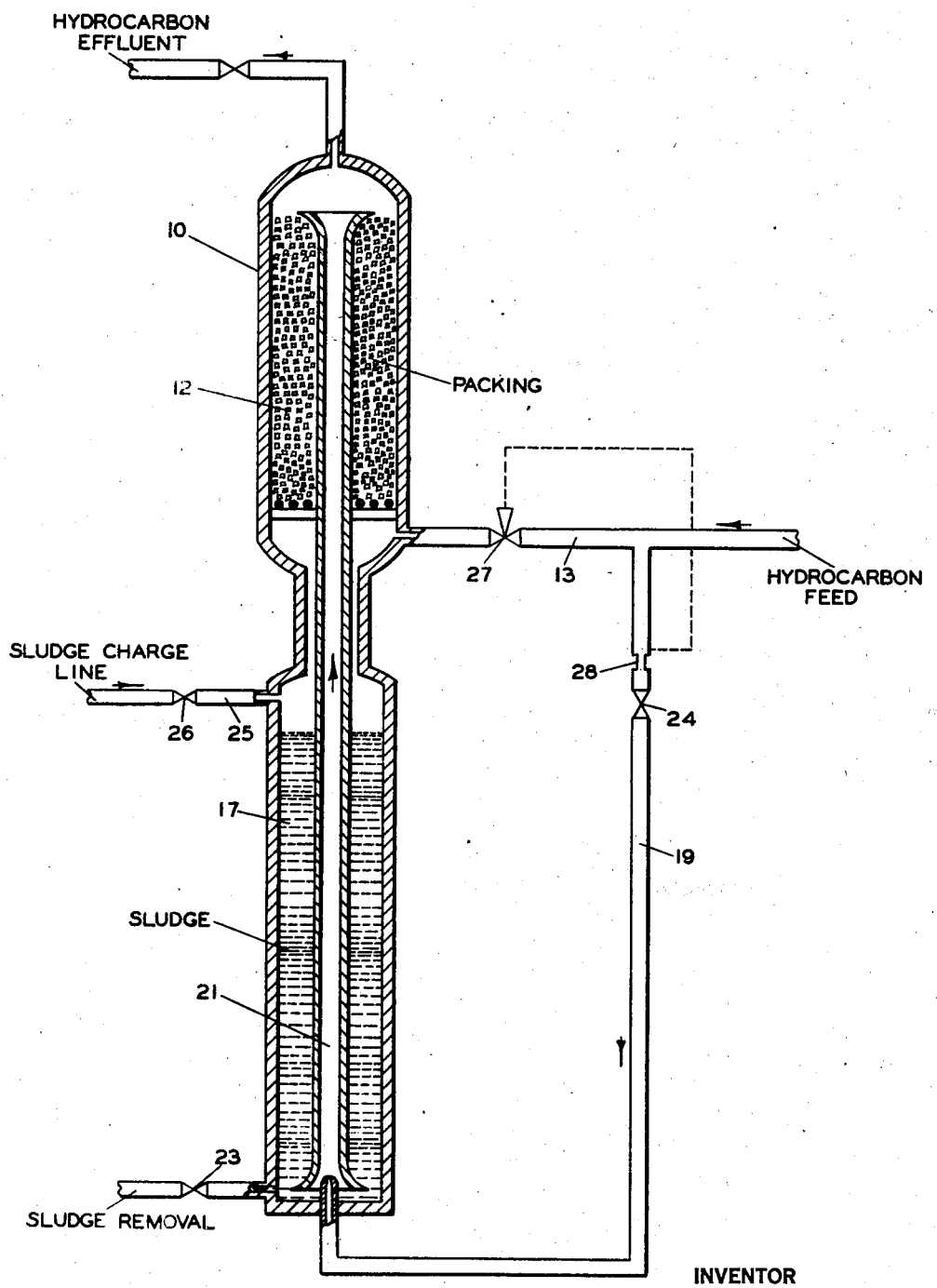
Figure 2 illustrates a modified form of apparatus which incorporates the sludge circulating means within the catalyst chamber proper, and also illustrates the manner in which a catalyst already in sludge form may be used for the activated charge material.

Figure 2 illustrates a modified structure in which the lift pipe 21 is placed inside the chamber 10, and the top of the reservoir 17 is connected to a sludge charge line 25, having a valve 26. The hydrocarbon charge line 13 in this modification contains a rate-of-flow controller 27 which is operatively connected to an orifice 28 in line 19.

In operation, this modification of my method and apparatus employs no solid catalyst, the chamber 10 being filled by packing bed 12. Catalytic sludge which may be obtained as waste from conventional catalytic units, or which may be a specially prepared suspension or slurry of solid catalyst in a suitable organic liquid, is introduced into reservoir 17 by line 25 and valve 26, this sludge constituting the entire catalyst charge. When exhausted, the sludge is removed through drain 23.

The operation of the gas lift is similar to the operation described in connection with Figure 1. By employing the controller 27, however, the circulation of sludge may be continuous. The rate of flow in line 19 is adjusted by valve 24 to an amount which will lift sludge through line 21 at a slow but continuous rate. Controller 27 is then adjusted to give the desired rate of flow into the bottom of vessel 10. Once adjusted, the controller 27 will maintain the flow into chamber 10 in constant proportion to the flow in line 19 and the differential across orifice 28. Thus the reflux of catalyst sludge is automatically maintained in proper relation to the hydrocarbon feed. The controller 27 can, of course, be placed in line 19 and the orifice 28 in line 13, if desired.

It is understood that various sub-combinations can be had between the various features shown in Figures 1 and 2. For example, the apparatus of Figure 1 can be fitted for continuous catalyst reflux by adding the flow controller 27 of Figure 2. Likewise, the apparatus of Figure 2 can be charged with solid catalyst as was described in Figure 1, and the operation may be made continuous or batchwise, as desired.

The external sludge return construction, shown in Figure 1, is well adapted to the use of heat exchangers in the sludge return line 21 for adjustment or maintenance of the reaction temperature. By application of either a steam jacket or of air cooling fins at some point in line 21, the temperature of returned sludge may be held at any desired value.

The structure shown in Figure 2, while not so well adapted to the application of external temperature control, has an inherent self-contained heat exchange characteristic, in that sludge accumulated in chamber 17 has an opportunity to cool down, after which the cooled sludge is returned through pipe 21 in heat exchange relationship with the surrounding material in chamber 10. Thus some of the heat of reaction generated in chamber 10 is removed, and the tendency for building up excessive temperatures, with resulting undesirable side reactions, is counteracted.

Likewise, the counter-current flow of hydrocarbon charge with respect to the return flow of catalyst in the packing bed will have a similar temperature-limiting effect in the case of both types of apparatus herein disclosed.

It is understood that my improved method and apparatus is well adapted to the use of various Friedel-Crafts type metal halide catalysts and of various organic charges. It is of particular advantage in the isomerizing or alkylating of relatively low-boiling hydrocarbons in the paraffin series, such as pentanes and butanes. The invention provides a convenient manner of handling metal halide sludges of the type described, and the sludges may be either catalytically active or totally spent, depending upon the conditions of use. The proper modifications required for a particular conversion will be obvious to those skilled in the art in view of the present disclosure.

I claim:

1. In a process for the contacting of an organic fluid with a Friedel-Crafts type metal halide sludge, the steps which comprise passing a first portion of the organic fluid into a low point of a contacting zone containing a pervious bed of solid material for upward flow through said bed, entraining said sludge in a second portion of said organic fluid and passing the resulting entrainment into a high point of said contacting zone, separating said sludge from its entraining fluid and flowing so-separated sludge downwardly through said bed in intimate contact with and countercurrent to said first portion of organic fluid, and withdrawing organic fluid from a high point in said contacting zone.

2. In a process for the catalytic conversion of fluid hydrocarbons by means of a metal halide catalyst of the Friedel-Crafts type in sludge form, the steps which comprise passing a first portion of the hydrocarbon fluid to be converted into a low point of a reaction zone containing a pervious bed of solid material for upward flow through said bed, entraining said sludge in a second portion of said hydrocarbon fluid and passing the resulting entrainment into a high point of said reaction zone, separating said sludge from its entraining fluid and flowing so-separated sludge downwardly through said bed in intimate contact with and countercurrent to said first portion of hydrocarbon fluid, and withdrawing from a high point in said reaction zone said second portion of hydrocarbon fluid and products of the conversion of said first portion of said hydrocarbon fluid.

3. A process for the catalytic conversion of fluid hydrocarbons which comprises passing a stream comprising a first portion of the hydrocarbon fluid to be converted into a low point of a reaction zone and flowing same upwardly through a pervious bed of solid material in said reaction zone, said reaction zone being maintained at conversion conditions, flowing a catalytically active Friedel-Crafts type metal halide sludge downwardly through said bed in said reaction zone in intimate contact with and countercurrent to said upwardly flowing stream of hydrocarbon fluid, collecting said sludge in a zone below said bed, returning said sludge to a high point in said reaction zone by fluid lift with a stream comprising a second portion of said hydrocarbon fluid and flowing thus-lifted sludge down through said bed, and removing said streams of hydrocarbon fluid together from a high point in said reaction zone.

4. A continuous process for the isomerization of normal butane to isobutane which comprises continuously flowing a gaseous stream of normal butane to a reaction zone maintained under isomerizing conditions and containing a vertically elongated permeable bed of solid material adapted to promote gas-liquid contact, dividing said stream into a first portion and a second portion and introducing said first portion into a low point in said reaction zone for upward flow therethrough while introducing said second portion into a liquid body of catalytically active aluminum chloride-hydrocarbon sludge maintained in a low zone below said bed, entraining said sludge in said second portion and passing same by gas-lift action into a high point in said reaction zone, flowing thus-lifted sludge downwardly through said bed in intimate contact with and countercurrent to said upwardly flowing first portion to effect the formation of isobutane by isomerization of normal butane, flowing sludge from said bed to said low zone by gravity, and continuously recovering a single gaseous stream from a high point in said reaction zone comprising unconverted normal butane and isobutane product.

5. The process according to claim 2 wherein a pervious bed of solid packing material and a separate pervious bed of solid Friedel-Crafts type metal halide catalyst are disposed within said reaction zone, said first portion of hydrocarbon fluid and said sludge pass countercurrently through said beds, and said sludge is formed by reaction between said hydrocarbon fluid and said solid catalyst.

6. The process according to claim 3 wherein the stream comprising a second portion of said hydrocarbon fluid and sludge being lifted is in indirect heat exchange with the contents of said reaction zone.

7. The process according to claim 1 wherein said metal halide is aluminum chloride.

8. The process according to claim 2 wherein said metal halide is aluminum chloride.

9. The process according to claim 3 wherein said metal halide is aluminum chloride.

LOUIS D. KLEISS.